United States Patent Office 3,414,224
Patented Dec. 3, 1968

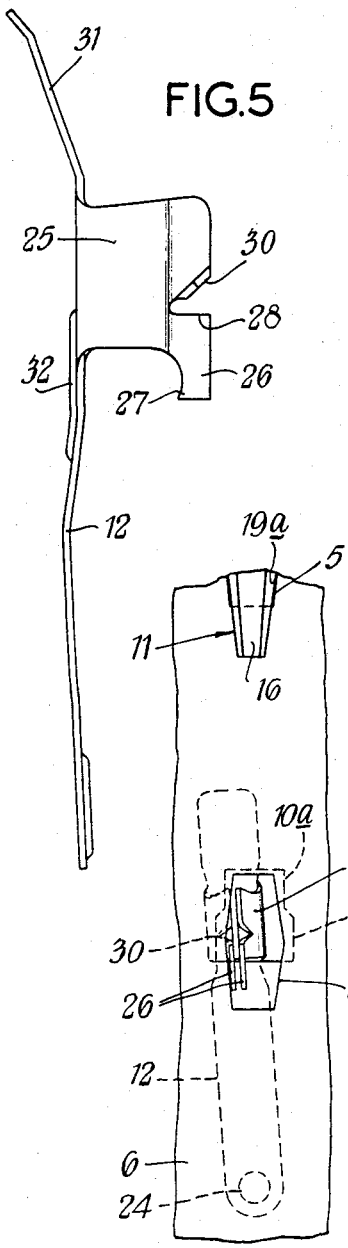
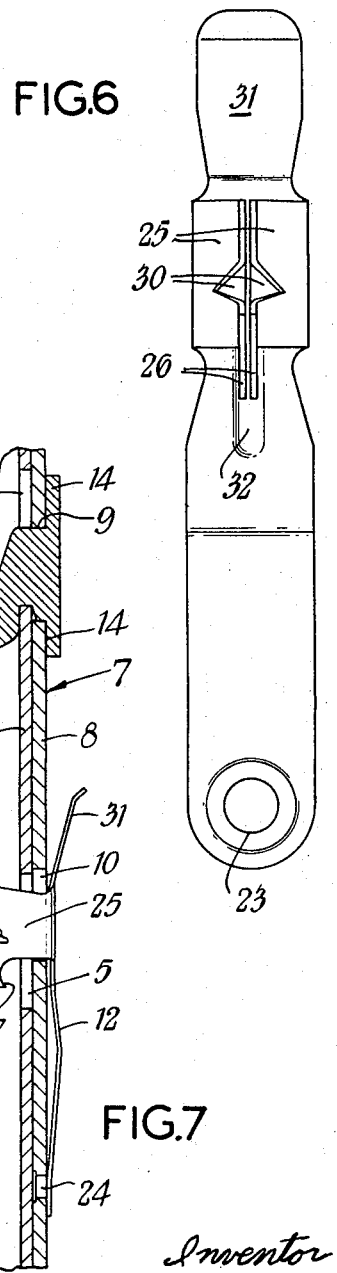

3,414,224
INTERLOCK STRUCTURAL MEMBERS
Leonard Thomas Robilliard and David Charles Watford, Middlesex, England, assignors to Dexion Limited, Middlesex, England, a corporation of Great Britain
Filed Mar. 28, 1966, Ser. No. 541,915
7 Claims. (Cl. 248—243)

This invention concerns improvements relating to racking of the type in which the basic components, namely uprights and beams, are held together by means of hooks, pins or the like provided on the one component and engageable in the holes provided in the other component and are locked together by locking devices. An object of the invention is to make provision for the easy assembly and disassembly and the safety of such racking, for instance robust racking intended more especially for the storage of goods on pallets.

According to the invention, means for holding a beam to an upright of racking of the type set forth comprises a locking device provided on the one component and adapted for engaging automatically with the other component when one is presented to the other, which device has means by which it can be held automatically out of engagement, and against re-engagement, with the upright during beam removal once the device has been deliberately released from the upright. With such locking devices, it can also be ensured that the beam cannot be inadvertently left unlocked. Moreover, accidental dislodgement of the beam can be prevented. For racking in which hooks provided on the beams are engageable in selected holes of a line of holes in the upright, the locking device is also provided on the beam and is engagable in a hole of the said line in the upright.

Advantageously, the hold-out means may be adapted for being tripped automatically to permit the locking device to return to its normal position, ready for automatic future engagement with an upright, as the beam is finally removed from the upright.

In, or for use in combination with, such means for holding a beam to an upright, a hook for supporting a beam from an upright may have a tapering nose adapted for guiding the hook into tight engagement with a hole in the upright in both the side-to-side and the front-to-back directions in relation to the upright.

Figure 1:
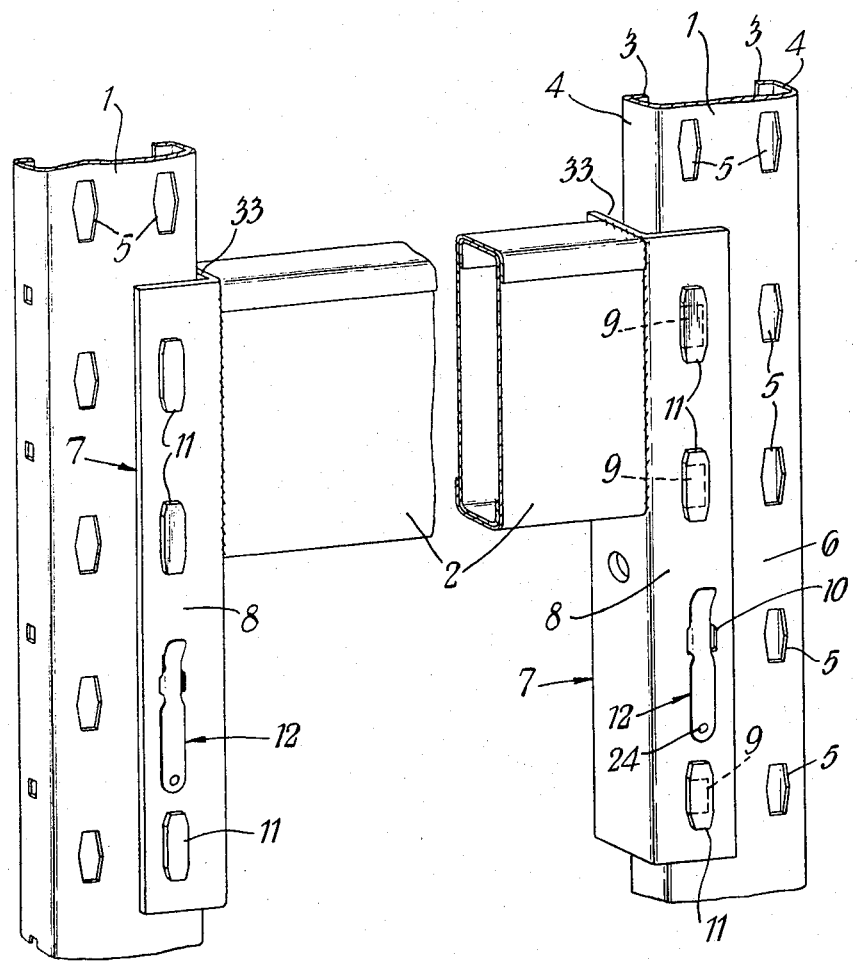
Figure 2:
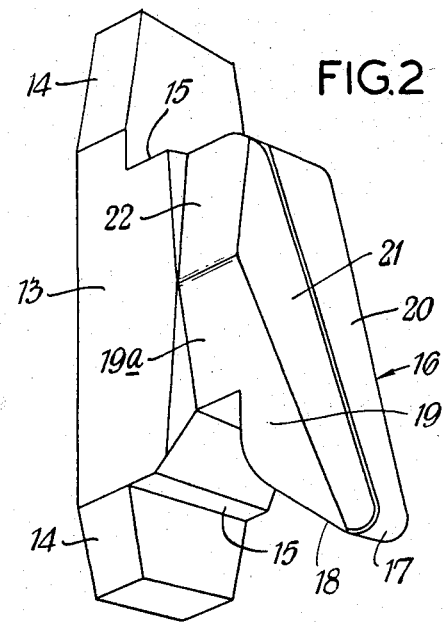
Figure 3:
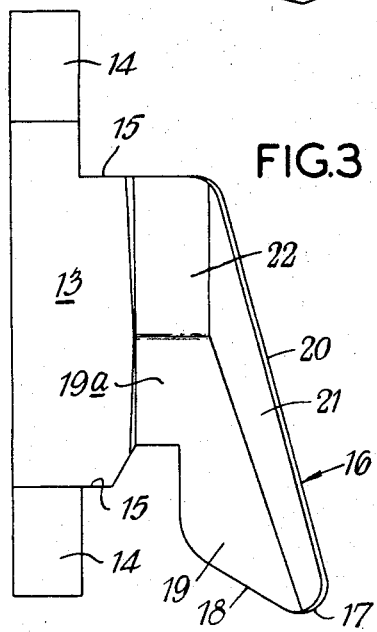
Figure 4:
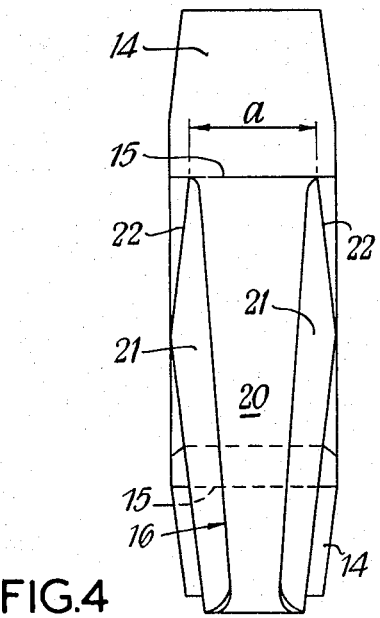

A preferred embodiment of the invention will now be more fully described by way of example and with reference to the accompanying drawings, in which:

FIG. 1 is a perspective view of part of a racking structure, showing portions of the two uprights and a beam, FIGS. 2, 3 and 4 are a perspective view, side elevation and front elevation respectively of a hook, all to a larger scale, FIGS. 5 and 6 are a side elevation and front elevation respectively of a locking device, FIG. 7 is a vertical section to a smaller scale through parts of a beam and upright showing a hook and locking device in their engaged positions, and FIG. 8 is an inside view of the same part of an upright, illustrating a stage in the release of the locking device.

For the example illustrated, it will be assumed that racking structures are built up from two basic components, namely uprights 1 and beams 2. As may be seen in FIG. 1, the uprights are cold-roll formed steel sections of rectangular channel shape with inturned lips 3 at the rear edges of their flanges 4 and with two vertical lines of equally pitched holes 5 in their front face 6. The holes 5 are of the shape of a vertically elongated symmetrical diamond with truncated top and bottom ends. The beams 2, which brace pairs of uprights 1 apart to form upright frames, may be of box or channel section. The beam 2 illustrated is composed of two lipped channels interlocked to form a box section. An angle-section vertical bracket 7 is welded to each end of the beam 2. The front flange 8 of each bracket has a vertical line of holes, 9, 10 (FIG. 1) of which the holes 9, of rectangular shape, receive three hooks 11, pins or the like for joining the beam 2 to the upright 1 by cooperation with the holes 5 in the latter in per se known manner. The hooks 11 may be welded or cast into the holes 9. Alternatively hooks integral with the brackets 7 may be employed. The intermediate hole 10, which is transversely elongated (FIG. 8) and formed with a narrower upward extension 10a from the middle of its upper edge, co-acts with a locking device 12 as hereinafter described.

The shape of a hook 11 may be seen in detail in FIGS. 2 to 4. In addition to the hook formation proper, it comprises a body 13 with end portions 14 which bear against the face of the flange 8 and with shoulders 15 with the assistance of which the body fits tightly into a hole 9 in the said flange, before being welded therein. The hook formation comprises a long nose 16 with a small tip 17 to facilitate initial entry into a hole 5. The nose has a sloping inner face 18, downwardly tapering flanks 19 and a sloping outer face 20 with bevelled cheeks 21, all to assist in self-guiding the hook and, consequently, the beam into the final position, even if the hook 11 is presented slightly high or otherwise slightly inaccurately in relation to a hole 5. The taper of the flanks 19 is the same as that of the sides of the hole 5, so that parts 19a of the said flanks will fit tightly in the hole. The hook engagement is thus rigid from side to side as well as from front to back. A suitable included angle for the taper is 14°, which will not cause such tight jamming that the hook cannot be released. The holes 5 are made symmetrical so that an upright 1 can be used either way up. To prevent jamming of the hook 11 in the top of the hole 5 during removal, however, the dimension a at the top of upwardly tapering flanks 22 is made less than the width at the top of the hole. The shape of the nose 16 also assists in removal of the hook 11 from the hole 5. In particular, the sloping face 20 will tend, when it engages the upper part of the hole 5 during lifting movement, to deflect the hook and, consequently, the beam away from the upright 1.

The locking device 12, shown in detail in FIGS. 5 to 7, has generally the form of an elongated strip, of spring steel, secured by a hole 23 at its lower end on a pivot 24, which may be a screw or rivet fixed in the front flange 8 of the bracket 7 just above the lowest hook 11. Toward its upper end, the strip has rearwardly extending and convergent wing portions 25 which project through the hole 10 in the flange 8. At the rear, each wing portion 25 has a downwardly extending tongue 26 with a forwardly directed point 27, the two parallel tongues forming a catch extending inside the lower edge of the hole 10. At about its mid-height, each wing portion is cut at 28 from the rear edge and the part above the cut is bent out obliquely to form a triangular tag 30. Above the level of the wing portions 25, the upper extremity of the strip is bent slightly outwardly to form a finger piece 31. A stiffening rib is pressed up from the strip at 32 (FIGS. 5 and 6).

The procedure for mounting a beam 2, which may be longer than the arm-span of the operator, upon a pair of uprights 1 is as follows: The beam is offered to the uprights at the required level so that the hooks 11 of each of the brackets 7 can enter selected holes 5 in the said uprights and, when the beam is pressed downwardly, interengage therewith. The several inclined surfaces on the hooks assist in guiding the beam into its final position. Initially during this operation, the locking devices 12 are pressed outwardly slightly by the engagement of their wing portions 25 with the faces 6 of the uprights above the upper edges of the holes 5, but towards the end of the downward movement of the beam 2, the said wings snap automatically into the said holes to the final position shown in FIG. 7. By engagement of the upper edges of these wing portions 25 with the upper edges of the holes 5, the said wing portions will thereafter resist any tendency for the beam to rise so that the hooks 11 could become disengaged from the uprights 1. Consequently the beam 2 is made safe against unintentional dislodgement from the uprights 1, such as might be caused, for example by careless handling of a fork-lift truck near to the racking. Only by following a definite procedure can the beam be released to permit removal.

The beam 2 can also be removed by a single operator. For this purpose, at each upright 1 in turn, he first of all flexes the locking device 12 outwardly and rocks it slightly about its pivot 24 from its normal vertical position (FIG. 1) to one or other side, as shown in FIG. 8, to enable one tag 30 to rest on part of the face 6 of the upright at the edge of the hole 5 where it is exposed by the hole 10 in the flange 8. With both locking devices thus held out of the holes 5, the beam 2 can be raised and released from the uprights 1. In the final stage of the release of the beam 2, however, each device 12 will, by contact of one of its divergent wings 25 with the adjacent side of the part 10a of the sole 10, be rocked back to the normal vertical position, in which the device can flex back to its initial condition. The hold-out effect is thus automatically tripped and the locking device 12 is re-oriented in readiness for automatic engagement whenever the beam 2 is to be again used.

The tongues 26 (FIG. 7), by engagement with the flange 8 below the hole 10, will prevent the locking device 12 from being damaged by being flexed outwardly to an excessive extent.

As may be seen from FIG. 1, there is a gap between the side flange 33 of each beam bracket 7 and the adjacent side flange 4 of the upright 1. This avoids risk of jamming of a beam 2 when introduced between two previously fixed uprights 1. It affords some latitude when beam 2 is offered up and facilitates both positioning and removal of the beam. As will be understood, the two lines of holes 5 permit beams to be mounted on either or both sides of an upright.

We claim:

1. A racking structure composed of upright and beam components provided with interengageable connection means; comprising, a first of said components having at least one locking device pivotally mounted on said first component and having a protrusion thereon passing through a hole in said first component; a second of said components having a second hole therein registerable with said first hole in said first component and having one dimension smaller than the corresponding dimension of said first hole in said first component so as to expose a portion of the face of said second component through said first hole when said first and second holes are in alignment; said second hole being adapted to be automatically engaged by said protrusion of said locking device when said first component is presented to said second component for interengagement of the connection and hold-out means on said protrusion of said locking device engageable with said exposed face of said second component beside said second hole, without relative movement between said first and second components, by which it is held out of engagement and against re-engagement with said second component during removal of said first component from said second component once the device has been deliberately released from said second component.

2. A racking structure in accordance with claim 1 wherein the locking device includes a spring strip pivotally mounted on the first component adjacent one end of said strip; the protrusion of said locking device is formed adjacent the other end of said strip; said protrusion of said spring strip is resiliently urged through the first hole in said first component and toward the second hole in the second component; and said protrusion is formed with a wing portion which projects from said strip and is engageable in the first hole in said first component.

3. A racking structure in accordance with claim 1 wherein the locking device includes a spring strip pivotally mounted on the first component adjacent one end of said strip; the protrusion of said locking device is formed adjacent the other end of said strip and is resiliently urged through the first hole of said first component and toward the second hole in the second component; and said protrusion has formed thereon an inclined portion engageable with the side of said first hole in said first component, whereby said protrusion will be automatically returned from an off-center position in said first hole to a generally central position in said first hole when said protrusion is out of contact with said second component.

4. A racking structure in accordance with claim 1 wherein the locking device includes a spring strip pivotally mounted on the first component adjacent one end of said strip; the protrusion of said locking device is formed adjacent the other end of said strip and is resiliently urged through the first hole in said first component and toward the second hole in the second component; and said protrusion has formed thereon a catch engageable with said first component adjacent the bottom of said first hole, whereby said spring strip is prevented from being flexed outwardly to an excessive extent by said catch.

5. A racking structure according to claim 1 wherein the hold-out means is adapted for being tripped automatically to permit the locking device to return to its normal position, ready for automatic future engagement with the second component, as the first component is finally removed from said second component.

6. A racking structure comprising upright and beam components provided with a least one hole in a first of said components and hook means on a second of said components for holding said second component to said first component and for supporting said second component on said first component; a tapering nose on said hook means bounded at the bottom by a wide, generally flat face which slopes upwardly towards said second component whereby said hook means, however it may be presented for entry into said hole in said first component, will be guided into engagement with said hole in the front-to-back direction as well as the side-to-side direction in relation to said first component; and said nose portion is bounded on the side remote from said second component by a surface inclined from the tip of said nose towards said second component and engageable with the top of said hole in said first component for assistance in guiding said hook element out of said hole in said first component when said second component is lifted.

7. A racking structure according to claim 6 wherein the first component has a line of holes of vertically elongated diamond shape with truncated upper and lower ends and the nose of the hook means has a root portion provided with flanks having a corresponding upward and downward taper.

References Cited

UNITED STATES PATENTS

| 2,948,409 | 8/1960 | Wroblewski et al. | 211—176 |
| 3,055,462 | 9/1962 | Steele. | |
| 3,208,778 | 9/1965 | Gordon. | |
| 3,219,157 | 11/1965 | Gordon. | |
| 3,273,720 | 9/1966 | Seiz | 211—148 |

ROY D. FRAZIER, *Primary Examiner.*

W. D. LOULAN, *Assistant Examiner.*